(12) United States Patent
Suderman

(10) Patent No.: US 8,550,235 B2
(45) Date of Patent: Oct. 8, 2013

(54) MAGNETIC FASTENING ASSEMBLY FOR ATTACHING A FERROUS METAL BAKING PAN TO A BAKING RACK

(75) Inventor: Donald A. Suderman, Wichita, KS (US)

(73) Assignee: Bunting Magnetics Co., Newton, KS (US)

( * ) Notice: Subject to any disclaimer, the term of this patent is extended or adjusted under 35 U.S.C. 154(b) by 284 days.

(21) Appl. No.: 12/834,087

(22) Filed: Jul. 12, 2010

(65) Prior Publication Data

US 2012/0005868 A1    Jan. 12, 2012

(51) Int. Cl.
*B65G 47/92*    (2006.01)
*A47G 1/17*     (2006.01)

(52) U.S. Cl.
USPC ............ 198/803.6; 198/690.1; 248/683; 248/309.4

(58) Field of Classification Search
USPC ......... 248/683, 206.5, 309.4, 223.31, 223.41, 248/225.11, 229.16, 229.26, 467; 24/303, 24/336, 339, 531, 545; 198/803.6, 690.1, 198/472.1, 867.04, 468.5, 750.13, 860.1, 198/377.05, 377.09, 679; 40/661.01, 40/661.03, 642.02; 211/41.4, 85.31, 211/90.03, 119, 126.9, 133.2, 133.5, 181.1, 211/106; 206/350; 269/8
See application file for complete search history.

(56) References Cited

U.S. PATENT DOCUMENTS

| | | | | |
|---|---|---|---|---|
| 4,301,915 A * | 11/1981 | Michalik et al. | ............... | 198/851 |
| 5,188,216 A * | 2/1993 | Smith et al. | ................ | 198/803.6 |
| 6,076,790 A * | 6/2000 | Richter | ....................... | 248/206.5 |
| 6,590,154 B1 * | 7/2003 | Badey et al. | ................... | 174/480 |
| 6,691,382 B1 * | 2/2004 | Su | ................................... | 24/545 |
| 7,114,614 B2 * | 10/2006 | Hamilton et al. | .......... | 198/803.6 |
| 2008/0110725 A1 * | 5/2008 | Allore | ......................... | 198/803.6 |
| 2008/0202052 A1 * | 8/2008 | Meier | .............................. | 52/367 |

* cited by examiner

*Primary Examiner* — Terrell McKinnon
*Assistant Examiner* — Ingrid M Weinhold
(74) *Attorney, Agent, or Firm* — Davis & Jack, L.L.C.; Kenneth H. Jack

(57) ABSTRACT

A fastening assembly for attaching a ferrous metal baking pan to a baking rack, the baking rack having a plurality of bars, the fastening assembly including an "E" plate having a stem and a plurality of arms, a pair of bar receiving channels, the channels consisting of the arms' interstices; at least a first permanent magnet; and a concavity and seal combination interconnecting the at least first permanent magnet and a medial arm among the "E" plate's plurality of arms.

12 Claims, 11 Drawing Sheets

MAGNETIC FASTENING ASSEMBLY FOR ATTACHING A FERROUS METAL BAKING PAN TO A BAKING RACK

FIELD OF THE INVENTION

This invention relates to industrial applications and uses of permanent magnets as releasable fasteners and as components of releasable fastening assemblies. More particularly, this invention relates to magnetic fasteners which are specially adapted for releasably attaching ferrous metal baking pans to movable or conveyable baking racks.

BACKGROUND OF THE INVENTION

In the bread and baked goods baking industry, bakable products such as yeast laden bread dough are commonly processed and cooked via conveyance along an automated bread line which mechanically incorporates a powered continuous loop chain conveyor. Such conveyors commonly carry bread dough through processing chambers such as a tunnel configured bread rising or proofing chamber and a tunnel configured bread baking chamber. Such powered continuous loop conveyor chains commonly support and carry a multiplicity of pan support racks which typically consist of matrix of rigid steel bars or wires. Ferrous metal baking pans containing the bread dough are commonly carried upon such racks through such bread rising and bread baking chambers.

In order to securely and releasably interconnect such ferrous metal bread baking pans with such continuous loop chain conveyed bread racks, magnetic fasteners are known to be provided for securely and releasably joining such pans with such racks. However, commonly known magnetic fasteners adapted for achieving such pan to rack interconnections typically are themselves difficult to attach to the bread racks or to detach from the bread racks. Additionally, such known magnetic fasteners are typically difficult to manufacture and assemble, and they commonly undesirably expose their supported permanent magnets to wear, corrosion and oxidation due to moisture exposure, debris fouling, and resultant degradation of magnetic strength and performance.

The instant inventive magnetic fastening assembly for attaching a ferrous metal baking pan to a baking rack solves or ameliorates problems, defects, and deficiencies of known magnetic fasteners for interconnecting bread pans with baking racks by providing a specialized "E" plate configured fastening assembly.

BRIEF SUMMARY OF THE INVENTION

A major structural component of the instant inventive fastening assembly for attaching a ferrous metal baking pan to a baking rack comprises an "E" plate having a plurality of cantilevered arms. Where the fastening assembly is configured for use in the carriage of ferrous metal bread pans during yeast rising bread processing operations (which typically occur at a temperature between 90° F. and 110° F.) the "E" plate component may desirably be composed of a high strength plastic material just as nylon or high density polyethylene. Alternatively, where the fastening assembly is for use during heated bread baking, the "E" plate preferably is composed of heat resistant metal such as aluminum, an aluminum alloy, copper, a copper alloy, brass, or stainless steel.

In the preferred embodiment of the instant inventive fastening assembly, the gaps or interstitial spaces between the arms of the "E" plate are sized, fitted and configured for receiving and retaining a pair of metal crossbars of a movable baking rack to which the "E" plate may be attached. Accordingly, in the preferred embodiment, the "E" configuration of the plate component of instant inventive fastening assembly presents a pair of longitudinally elongated "C" clip fasteners, the arms of the "C" clips comprising the "E" plate's arms. Such "C" clip configured "E" plate arms securely receive, hold, and facilitate the release of the bars of a movable baking rack.

Also in the preferred embodiment of the instant inventive fastening assembly, the distal end of a medial arm among the "E" plate's plurality of arms includes magnet attaching means. Such means preferably comprise a downwardly opening concavity which is fitted for receiving at least a first, and preferably a plurality of permanent magnets. In order to protect such received and housed magnets from corrosion and degradation due to oxidation, such magnetic attaching means preferably further comprises a sealing plug or cover which hermetically closes such concavity and which underlies and supports the magnets.

Accordingly, it is an object of the instant invention to provide a fastening assembly for attaching a ferrous metal baking pan to a baking rack which incorporates structures, as described above, and which arranges those structures with respect to each other in manners described above, for the performance of useful functions as described above.

Other and further objects, benefits, and advantages of the present invention will become known to those skilled in the art upon review of the Detailed Description which follows, and upon review of the appended drawings.

DETAILED DESCRIPTION OF PREFERRED EMBODIMENTS

Figure 1:
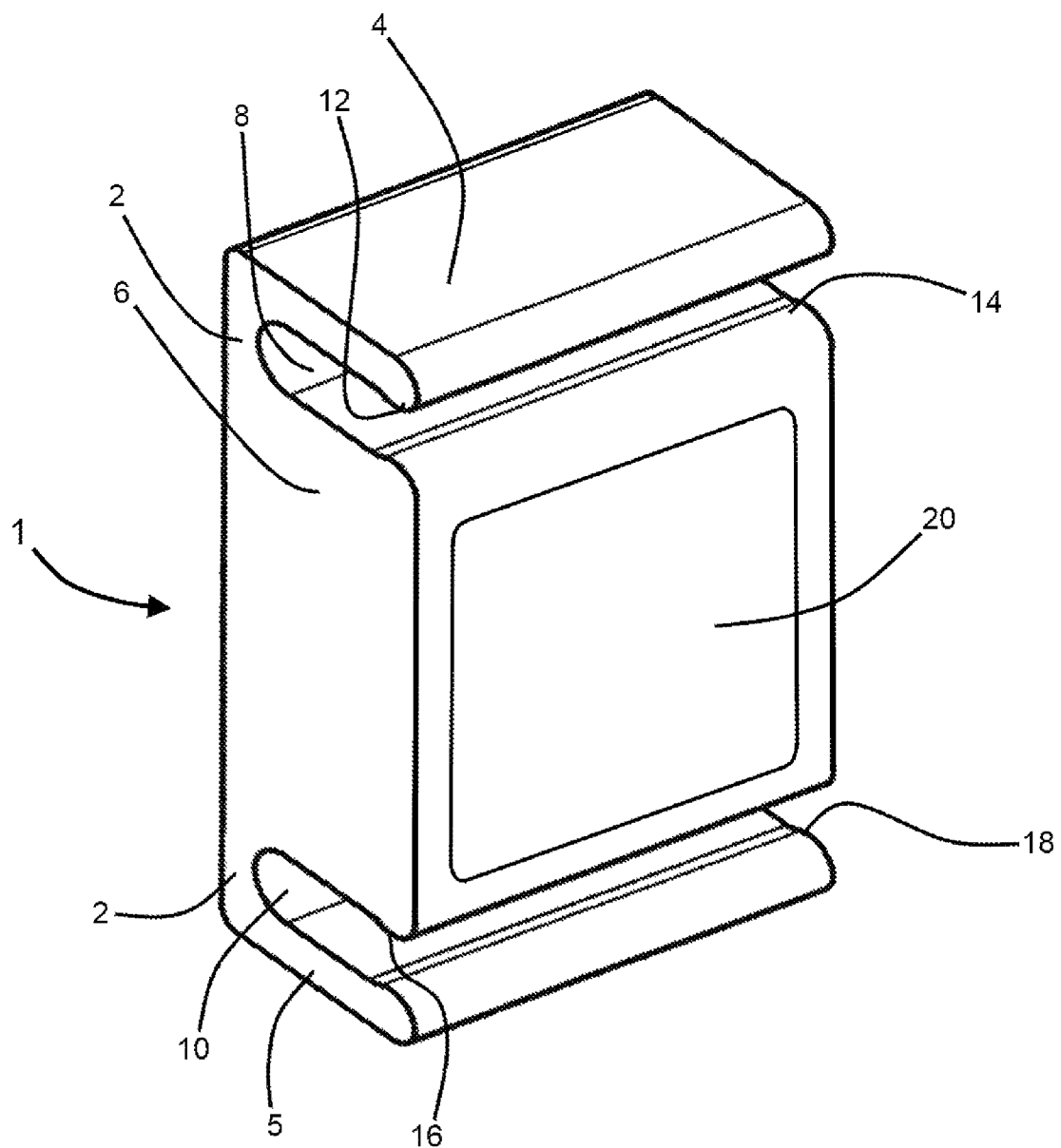
FIG. 1 is a perspective view of a preferred embodiment of the instant inventive assembly for securing a ferrous metal baking pan upon an oven rack.

Referring now to the drawings, and in particular to Drawing FIG. 1, a preferred embodiment of the instant inventive assembly for securing a ferrous metal baking pan upon an oven rack is referred to generally by Reference Arrow 1. The assembly 1 preferably comprises an "E" plate having a stem section 2, and having a plurality of arms 4, 5 and 6 which are fixedly attached to or are formed wholly with the stem section 2. The gaps, channels, or interstices 8 and 10 which are formed, bounded, and defined by the plate's arms 4, 5, and 6 advantageously function as at least a first baking rack bar receiving space or channel, and preferably as a pair of such channels.

Longitudinally extending ridges 12, 14, 16, and 18 are preferably fixedly attached to or formed wholly with the distal ends of the assemblies' arms 4, 5, and 6, each one of such ridges 12, 14, 16, or 18 extending into one of the channels 8 or 10 for releasably retaining a bar received therein, as is further described below. The "E" plate's arms 4, 5, and 6 in combination with their longitudinally extending ridges 12, 14, 16, and 18 advantageously form and define longitudinally extending bar retaining "C" clips at the lateral ends of the "E" plate.

Figure 2:
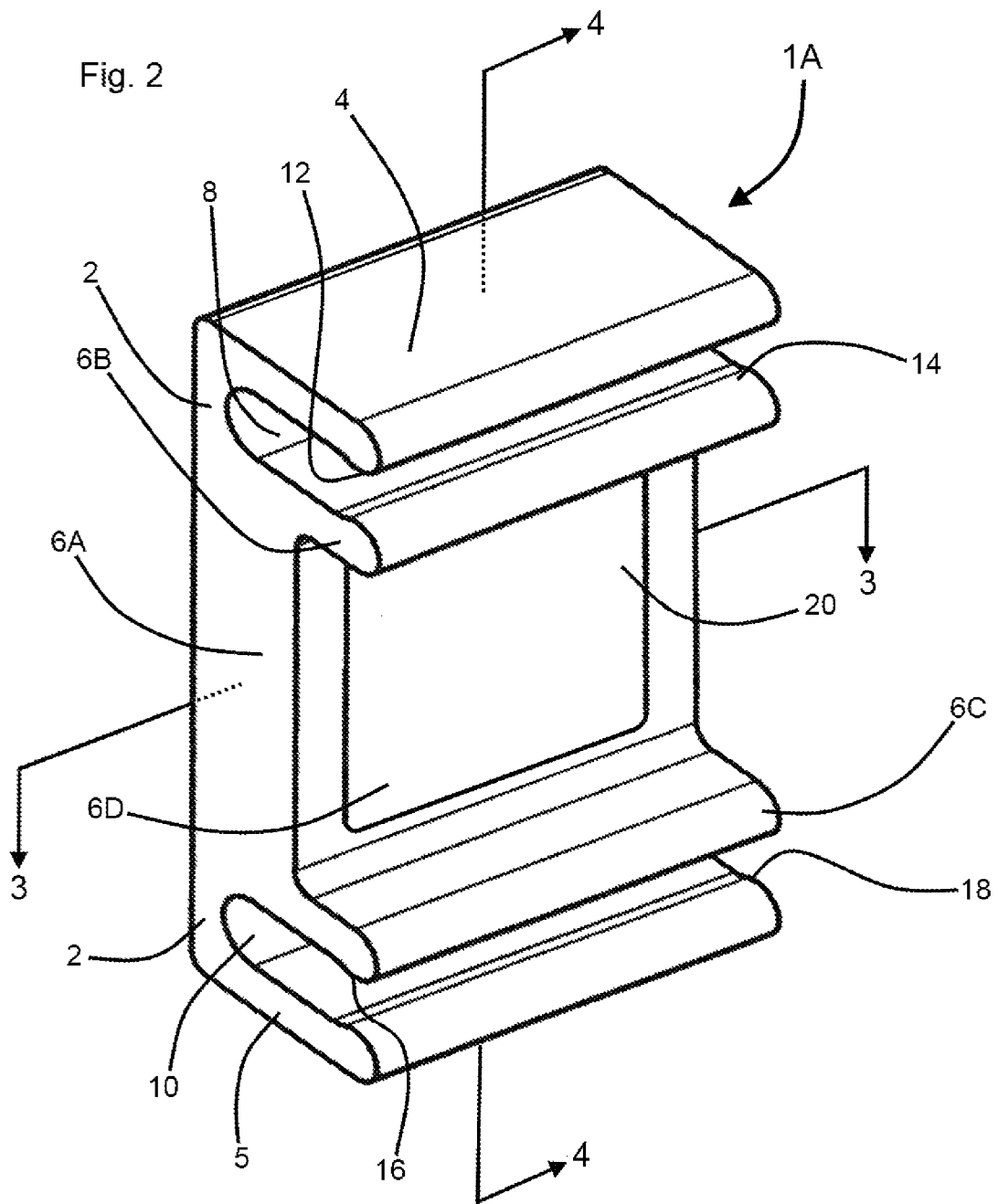
FIG. 2 redepicts the assembly of FIG. 1, the view of FIG. 2 showing an alternative configuration including an expanded medial arm distal end concavity.
Figure 3:
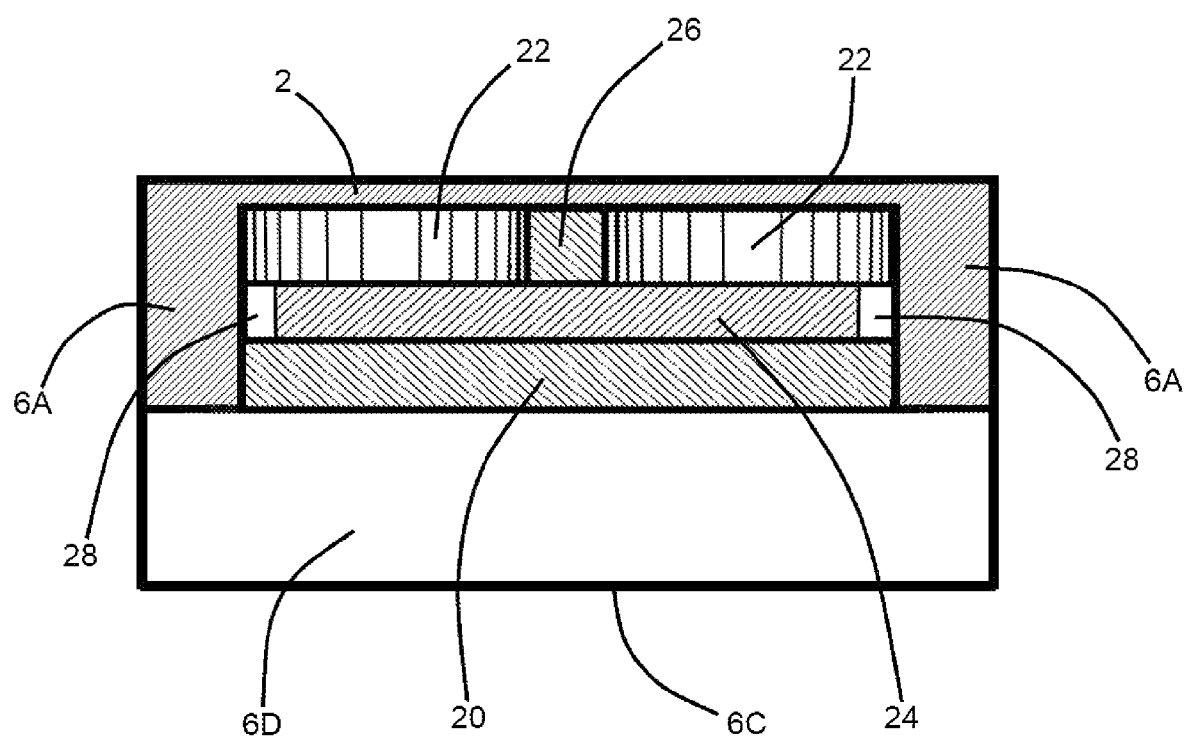
FIG. 3 is a sectional view as indicated in FIG. 2.

Referring simultaneously to FIGS. 1-3, the instant inventive assembly 1 or 1A preferably further comprises at least a first permanent magnet 22, and preferably comprises a plurality of such magnets. Where the magnets 22 are intended to be utilized within a bread baking environment between 300° F. and 550° F., such magnets are preferably composed of the heat resistant magnetic material, such as alnico or aluminum, nickel, and cobalt compound magnets, or samarium cobalt magnets.

Referring further to FIGS. 1-3, the instant inventive fastening assembly 1 or 1A preferably further comprises attaching means for interconnecting the at least first permanent magnet 22, or the preferred provided plurality of such magnets, and the "E" plate's medial arm 6 or 6A, 6B, 6C. In a preferred embodiment, the magnet attaching means of the assemblies 1 or 1A comprise a concavity 28 which is milled or molded into the distal end of the "E" plate's medial arm 6 or 6A. As is specifically shown in FIG. 2, such concavity 28 may be continuous with a distally situated expanded concavity portion 6D which, in comparison with the solid configuration of the "E" plate of FIG. 1, provides a measure of materials savings and lends an additional measure of lateral flexibility to ridges 14 and 16 by creating the cantilevering medial arm sections 6B and 6C. Due to such arm flexibility and materials savings functions, the 6A, 6B, 6C, 6D medial arm configuration of the fastener assembly 1A of FIG. 2 is often preferred over the solid configuration of the medial arm 6 of the assembly 1 of FIG. 1.

Referring further simultaneously to FIGS. 1, 2, and 3, the magnet attaching means component of the instant inventive fastening assembly preferably further comprises a plug or seal 20 which closes the opening of the concavity 28 and which protects magnets 22 contained within such concavity from degradation and damage due to moisture contact oxidation, or fouling from exposure to soot and cooking oils. In a preferred embodiment, such magnet attaching means component 20 comprises a hardened deposition of epoxy resin. Suitably, such sealing component 20 may alternatively comprise a closely fitted plug or plate which may be adhesively placed within the opening of the concavity 28, or may be soldered or brazed in place.

Figure 4:
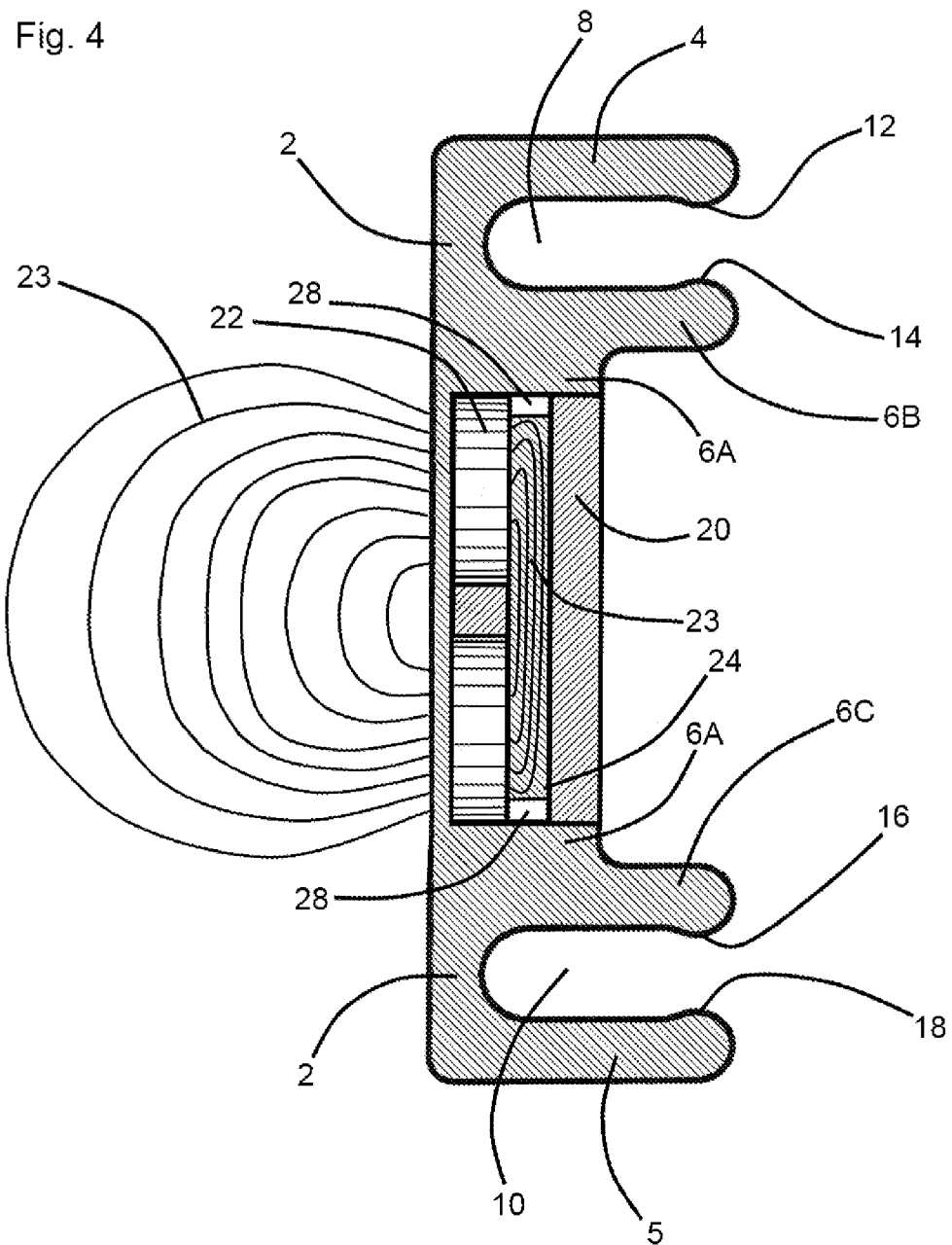
FIG. 4 is an alternate sectional view, as also indicated in FIG. 2.
Figure 5:
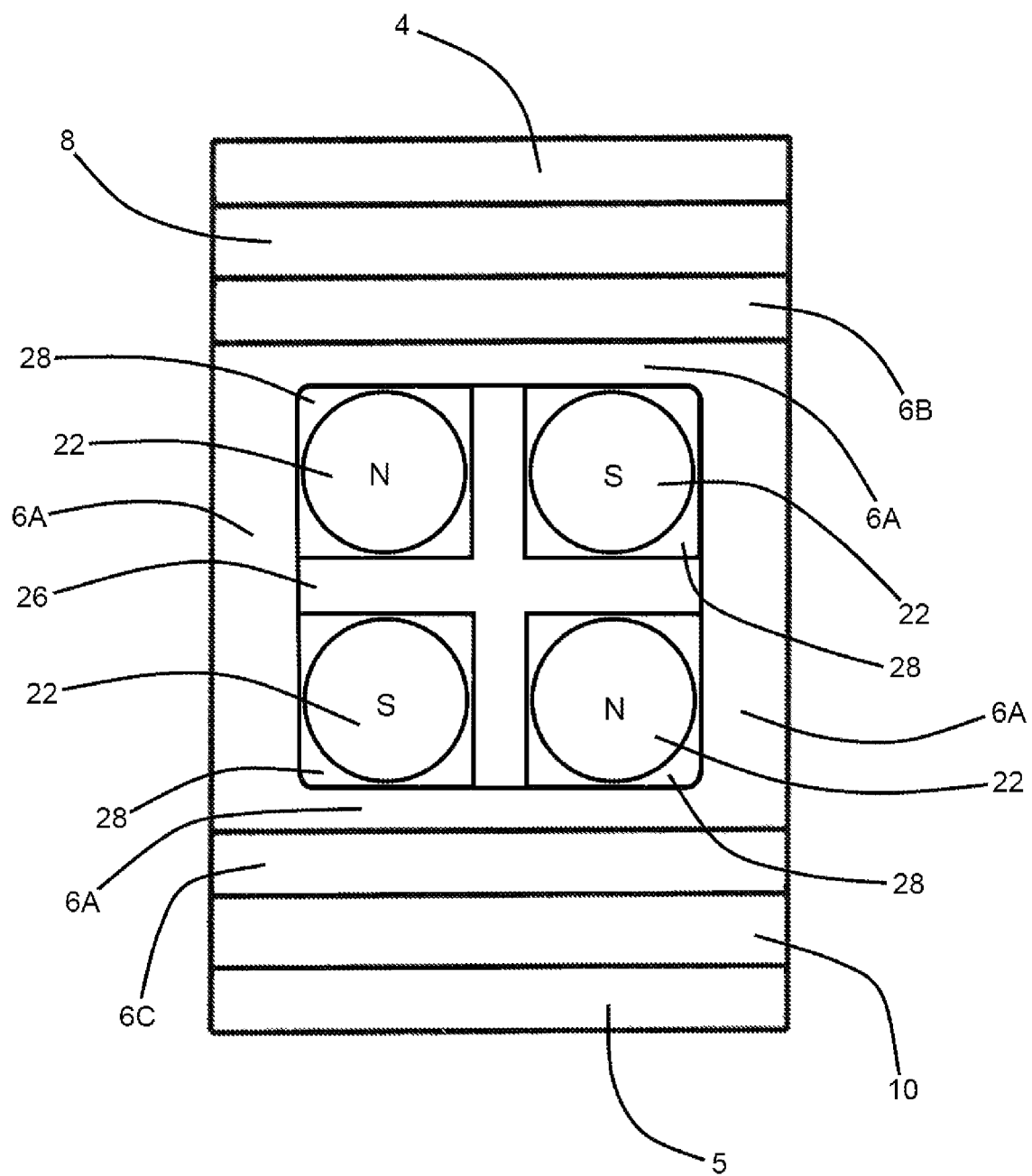
FIG. 5 is an undersurface elevation of the assembly of FIG. 2, the view of FIG. 5 showing sealing and armaturing elements removed.
Figure 6:
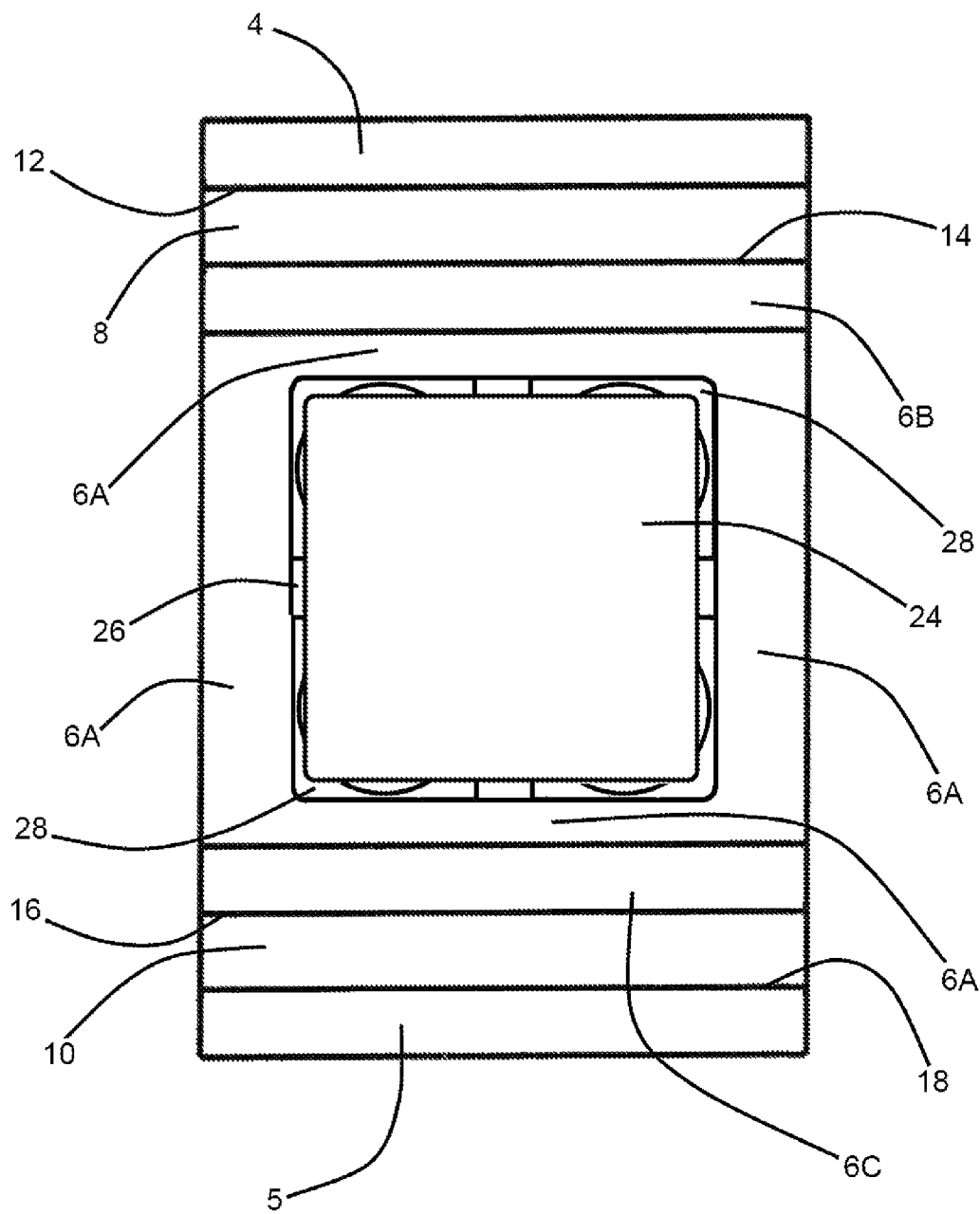
FIG. 6 redepicts FIG. 5, the view of FIG. 6 showing placement of an armaturing element.
Figure 7:
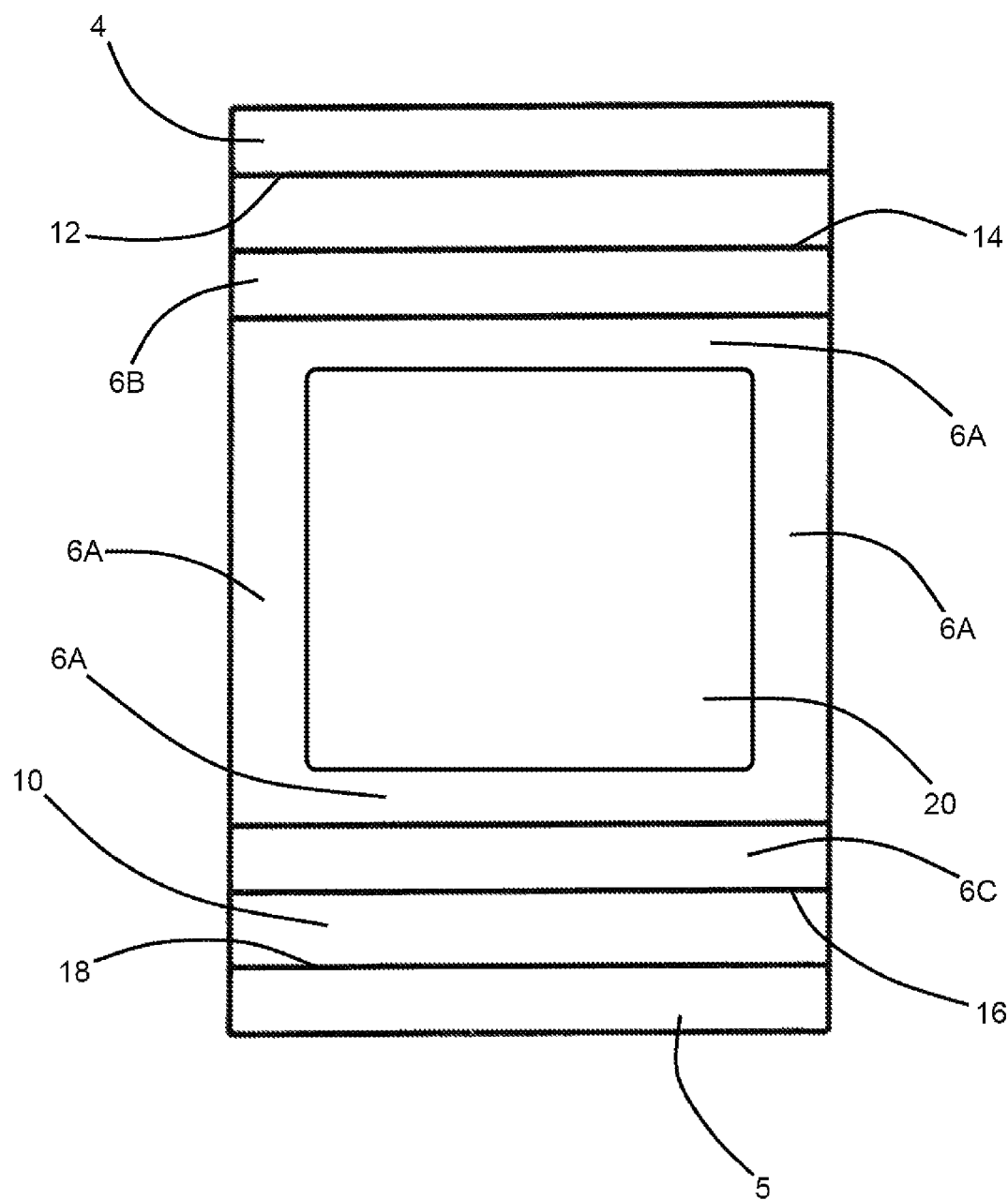
FIG. 7 redepicts FIG. 6, the view of FIG. 7 showing both the armaturing element and replacement of the sealing element.

Referring simultaneously to FIGS. 3-7, four antipodally oriented magnets 22 having alternating north/south polarities are preferably received and positioned within the four quadrants of the concavity 28. A non-ferromagnetic or magnetically transparent cross-spacer 26 is further received within the concavity 28, such spacer 26 assuring that the magnets 22 remain within their quadrant positions as depicted in FIG. 5. In a preferred embodiment, the cross-spacer 26 is composed of the same material as the "E" plate. Following receipt within the concavity 28 of the magnets 22 and cross-spacer 26, a mild steel magnetic armature 24 is placed over the magnet's antipodally arranged poles.

Referring to FIG. 4, it may be seen that lines of magnetic flux emanating from the magnets 22 strongly outwardly emanate from the "E" plate's stem section 2, and have little or no emanation in the opposite downward direction away from the sealing component 20. Such flux differential results from the armaturing affect of the magnetic armature 24 across the oppositely arranged poles of the permanent magnets 22.

Figure 8:
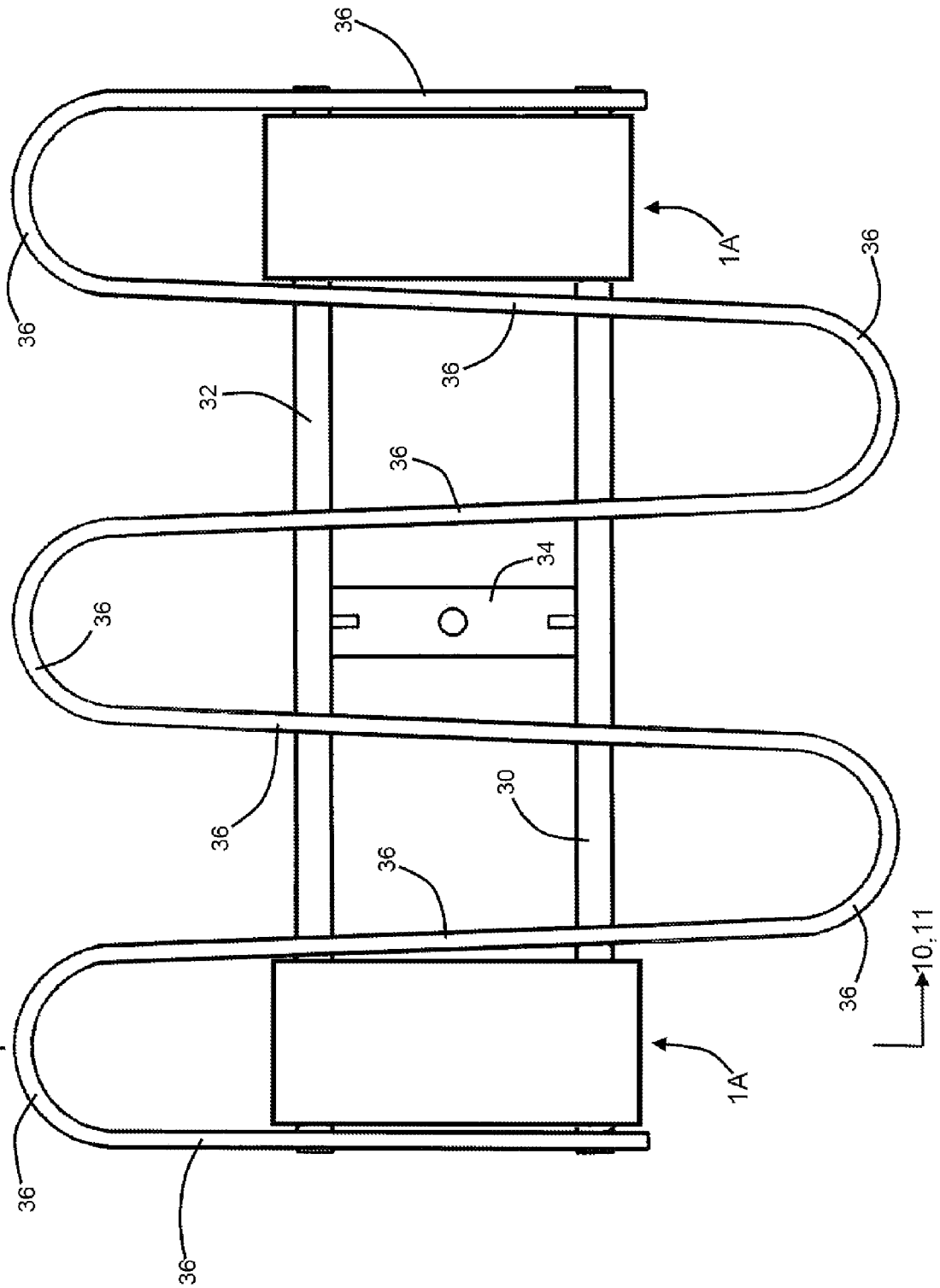
FIG. 8 depicts the instant inventive assembly in use as attached to a common movable and conveyable baking rack.

Referring simultaneously to FIGS. 2 and 8, in use of the instant inventive fastening assembly, two renditions of the fastener 1A are shown attached to a movable or conveyable bread baking rack, such rack typically consisting of a conveyor chain attachment 34, a pair of support rails 30 and 32, and a matrix of crossbars 36.

Figure 9:
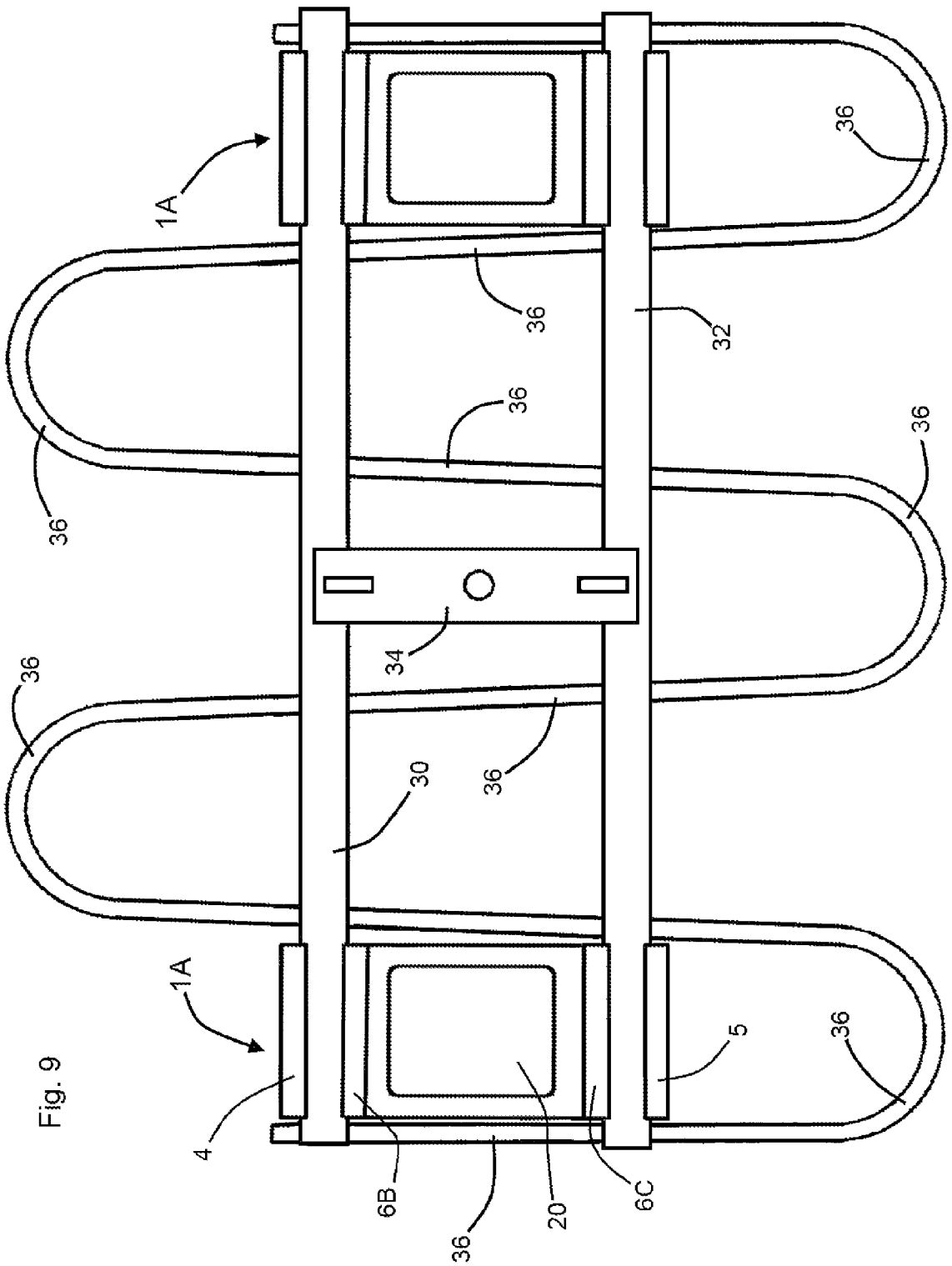
FIG. 9 presents a reverse or undersurface view of the structure depicted in FIG. 8.
Figure 10:
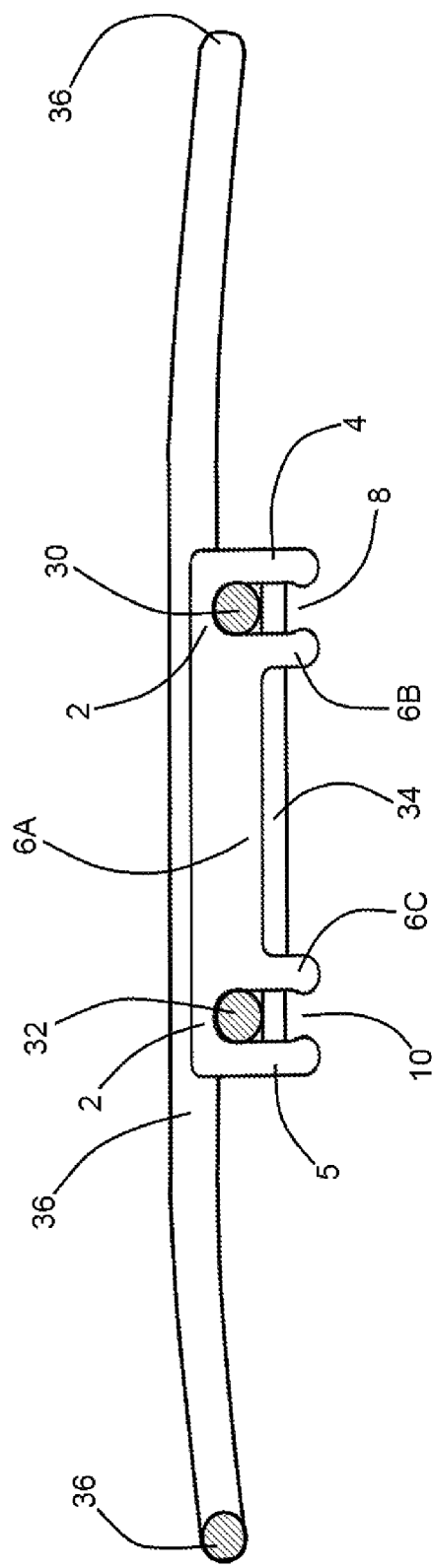
FIG. 10 is a sectional view as indicated in FIG. 8.

Referring further simultaneously to FIGS. 9 and 10, it may be seen that upon attachment of the fastening assemblies 1A to such bread baking rack, the circular cross-sections of the rails 30 and 32 are received within the "C" clip configured channels 8 and 10.

Figure 11:
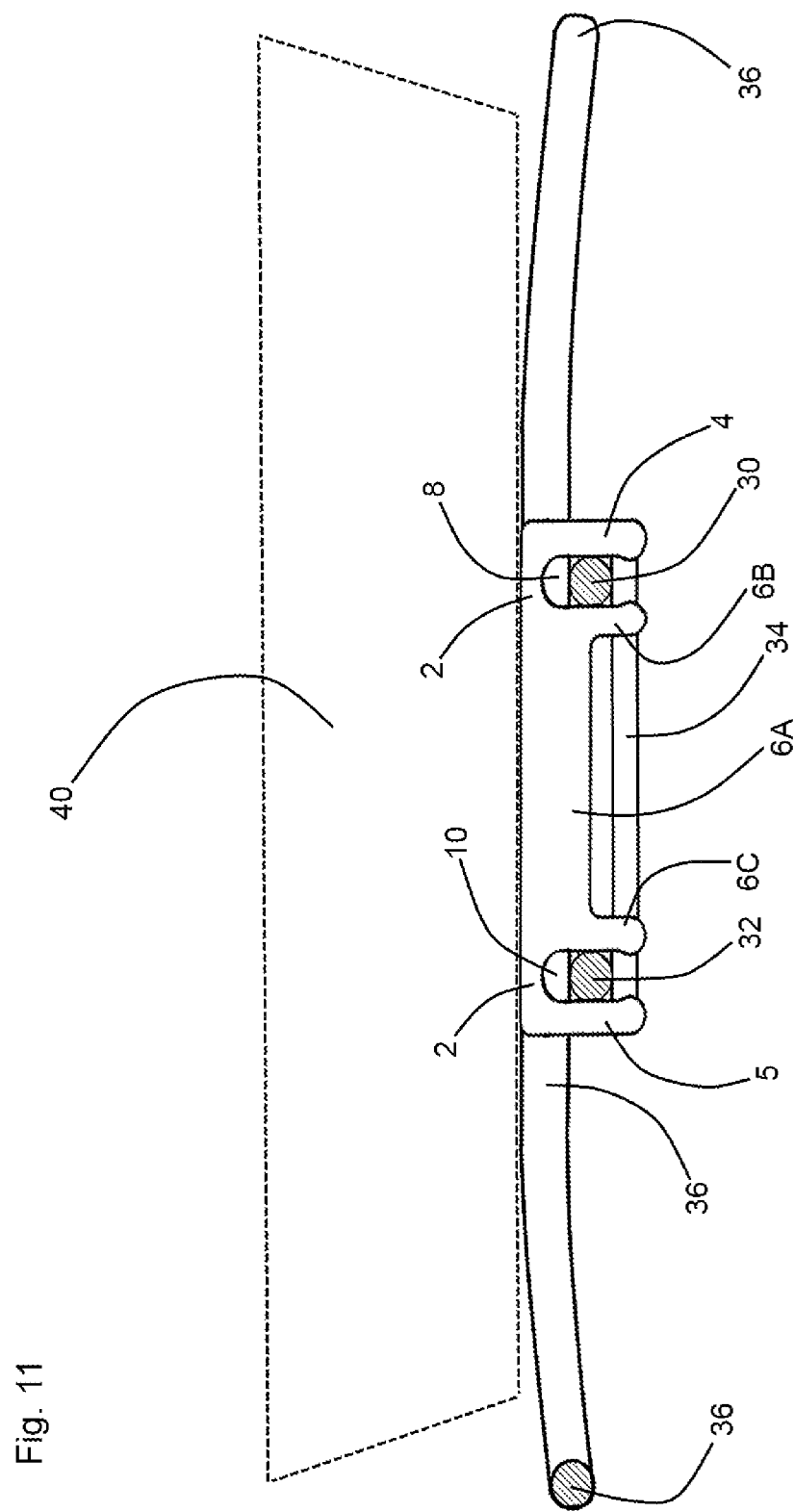
FIG. 11 redepicts FIG. 10, the view of FIG. 7 additionally showing a supported ferrous metal baking pan, and showing the assembly magnetically repositioned in response to its magnetic connection with such pan.

Referring simultaneously to FIGS. 9, 10, and 11, it may be seen that the proximal-distal dimension of the "E" plate's stem section 2 is less than the circular diameter of the crossbars 36. As a result of such proportioning of structures, the proximal or upper surface of the "E" plate's stem section advantageously distally underlies the pan supporting surfaces of the crossbars 36 while no ferrous metal baking pan is situated thereon. Upon placement of a ferrous metal baking pan 40 upon the crossbars 36, the fastening assemblies 1A are magnetically attracted upwardly into contact and secure engagement with the undersurface of the baking pan 40. Channels 8 and 10 are preferably distally oblongated by the lengths of the arms 4, 5, and 6A, 6B, 6C, in order to facilitate relative vertical travel of the support rails 30 and 32 within the channels 8 and 10.

Referring to FIGS. 1 and 2, it may be seen that the lateral cross-sectional shapes of the "E" plate configurations 1 and 1A are longitudinally consistent, making them amenable to fabrication via extrusion molding. Referring further to FIG. 3, upon such extrusion molding, which is preferred, rotary milling may be performed at and into the distal end of the "E" plate's medial arm 6 or 6A to form the magnet receiving, retaining, and protecting concavity 28.

While the principles of the invention have been made clear in the above illustrative embodiment, those skilled in the art may make modifications in the structure, arrangement, portions and components of the invention without departing from those principles. Accordingly, it is intended that the description and drawings be interpreted as illustrative and not in the limiting sense, and that the invention be given a scope commensurate with the appended claims.

I claim:

1. A fastening assembly for attaching a ferrous metal baking pan to a baking rack, the baking rack having a plurality of bars, the fastening assembly comprising:
   (a) an "E" plate having a stem and a plurality of parallel co-extending arms extending from the stem, the stem and the plurality of co-extending arms defining at least a first "C" clip fastener, the at least first "C" clip fastener having an open bar receiving channel adapted for releasably retaining one of the bars;
   (b) at least a first permanent magnet for attachment to the ferrous metal baking pan; and
   (c) attaching means interconnecting the at least first permanent magnet and an arm among the "E" plate's plurality of co-extending arms.

2. The fastening assembly of claim 1 wherein the "E" plate's stem and plurality of co-extending arms further define a second "C" clip fastener having a second open bar receiving channel.

3. The fastening assembly of claim 2 wherein the plurality of co-extending arms includes a medial arm, and wherein the attaching means comprises a concavity, the concavity being positioned at and opening at the medial arm, the concavity being fitted for receiving the at least first magnet.

4. The fastening assembly of claim 3 wherein the concavity's opening is positioned at the medial arm's distal end.

5. The fastening assembly of claim 4 wherein the attaching means further comprises sealing means adapted for closing the concavity's opening.

6. The fastening assembly of claim 5 wherein the sealing means comprises a plug or a hardened epoxy resin deposition.

7. The fastening assembly of claim 3 wherein each of the co-extending arms has a proximal end, a distal end, and a longitudinal extension, and further comprising a plurality of cross bar retaining ridges, each ridge among the plurality of cross bar retaining ridges being fixedly attached to or wholly formed with the "E" plate, and each such ridge being positioned to extend from one of the co-extending arms' distal ends and into one of the open bar receiving channels.

8. The fastening assembly of claim 7 wherein the open bar receiving channels are oblongated from the stem.

9. The fastening assembly of claim 8 wherein the "E" plate comprises a longitudinal extrusion of a thermo-setting material selected from the group consisting of plastics, aluminum, aluminum alloys, copper, copper alloys, brass, and steel.

10. The fastening assembly of claim 4 further comprising a second permanent magnet, and wherein the concavity is further fitted for receiving the second permanent magnet.

11. The fastening assembly of claim 10 wherein the at least first and second permanent magnets are oriented antipodally with respect to each other and further comprising a magnetic armature, the concavity being further fitted for receiving the magnetic armature.

12. The fastening assembly of claim 11 wherein the at least first and second permanent magnets' are arranged to distally extend a pair of their magnetic poles from the "E" plate's stem, and wherein the magnetic armature is positioned to span between said poles.

\* \* \* \* \*